United States Patent
Chiu et al.

(10) Patent No.: US 11,985,143 B2
(45) Date of Patent: May 14, 2024

(54) BLOCKCHAIN-BASED ACCOUNTABLE DISTRIBUTED COMPUTING SYSTEM

(71) Applicant: Mitsubishi Electric Research Laboratories, Inc., Cambridge, MA (US)

(72) Inventors: Tsz-Chun Michael Chiu, Toronto (CA); Uros Kalabic, Jamaica Plain, MA (US); Abraham Goldsmith, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 146 days.

(21) Appl. No.: 17/234,041

(22) Filed: Apr. 19, 2021

(65) Prior Publication Data

US 2022/0337602 A1 Oct. 20, 2022

(51) Int. Cl.
*H04L 29/06* (2006.01)
*H04L 9/32* (2006.01)
*H04L 9/40* (2022.01)
*G06F 16/27* (2019.01)
*H04L 9/00* (2022.01)

(52) U.S. Cl.
CPC ........ *H04L 63/1416* (2013.01); *H04L 9/3239* (2013.01); *H04L 63/10* (2013.01); *G06F 16/27* (2019.01); *H04L 9/50* (2022.05)

(58) Field of Classification Search
None
See application file for complete search history.

(56) References Cited

U.S. PATENT DOCUMENTS

| | | | | |
|---|---|---|---|---|
| 11,138,159 | B1* | 10/2021 | Cascioli | G06F 16/156 |
| 11,475,442 | B1* | 10/2022 | James | G06Q 20/3829 |
| 2021/0109776 | A1* | 4/2021 | Behl | G06F 9/451 |
| 2022/0173885 | A1* | 6/2022 | Behl | H04L 9/002 |
| 2022/0188423 | A1* | 6/2022 | Ndu | G06F 21/577 |

FOREIGN PATENT DOCUMENTS

CN 111191212 A * 5/2020 ........... G06F 21/335

* cited by examiner

*Primary Examiner* — Harunur Rashid
(74) *Attorney, Agent, or Firm* — Gene Vinokur

(57) ABSTRACT

A method and a system for fault detection and removal in a distributed computing system, implemented as a permissioned blockchain network, is disclosed. The method fault detection comprising compiling and executing a smart contract common for all nodes of the permissioned blockchain network. The smart contract is configured to perform at least one operation from a series of operations comprising: (1) appending transactions including logs indicative of exchanging of messages between the nodes of permissioned blockchain network, (2) detecting malicious behavior of a node in reaching a consensus, and (3) revoking the access of the node upon detecting the malicious behavior. Further, once malicious behavior (and corresponding malicious node) is detected, a consensus is reached between the networked computers of the permissioned blockchain network, by executing a distributed computing program.

15 Claims, 13 Drawing Sheets

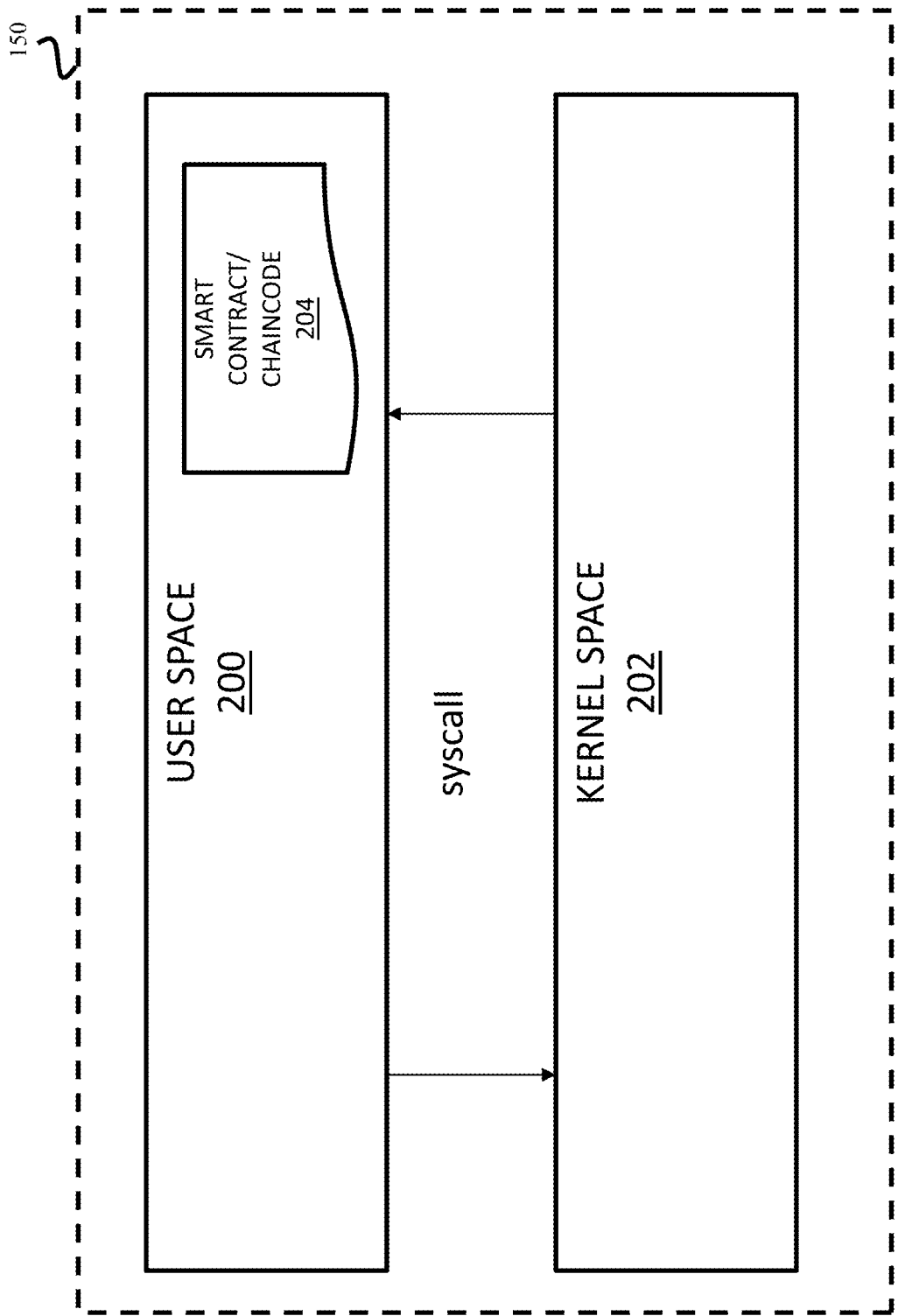

BLOCKCHAIN-BASED ACCOUNTABLE DISTRIBUTED COMPUTING SYSTEM

TECHNICAL FIELD

The present disclosure relates generally to distributed computing systems, and more particularly to methods and systems for detecting and removing faults in blockchain-based accountable distributed computing systems.

BACKGROUND

Distributed computing systems are groups of networked computers that are distributed across geographically distinct locations. The components of a distributed computing system may comprise a plurality of nodes, such that each node is a single networked computer, and the nodes communicate with each other through the exchange of messages in order to achieve a common goal, such as to carry out a computation (for example, an ATM transaction). In some scenarios, in order for any critical computation to be carried out by the distributed computing system, consensus must be reached by the components. This in turn relies on two important properties within the distributed computing system: trust between components and robustness to component failures. Components need to trust that other components are not acting maliciously. Without trust, it is impossible for the distributed computing system to reach a consensus or carry out critical computations. In such a case, at best, a component may discard suspicious messages or may encounter a recoverable error from a malicious input, and, at worst, a component fails due to a malicious input from a trusted component that is acting maliciously.

Similarly, distributed computing systems must be robust to a component as they contain a much greater number of components than centralized systems. The necessity of trust in distributed computing systems is a source of vulnerability that many malicious actors attempt to exploit.

One known solution for ensuring that a distributed system (such as the distributed computing system discussed above) is tolerant to malicious participants or component failures and, in their presence, progresses in its computations is known as Byzantine Fault Tolerance (BFT) to those skilled in the art. While BFT approaches aim to make the distributed system more resilient to Byzantine faults, another approach to increasing the robustness of distributed systems is to remove the components causing the Byzantine faults. This is known as accountability and is a property of the distributed system for enabling the detection, identification, and isolation of malicious participants within the distributed system. Accountability provides additional advantages such as assignment of non-repudiable responsibility to the participants of the distributed system(s), especially when the participant is one of the malicious participants, and further increasing transparency within such a system. Accountability further relies on auditability of the system, and in the solutions known in the art for the problem of malicious participants in the system and ensuring accountability, involves substantial complexity and incurs a high computational cost for implementations.

Accountability consists of the following three properties:

Fault prevention: discouragement of malicious behavior by increasing its cost.

Fault tolerance: detection and isolation of faults and prevention of their spread to other parts of the system.

Fault removal: removal of misbehaving actors from the system to limit their impact on the rest of the system.

In order to achieve accountability, the actions of each participant must be auditable. Auditability of a system requires a secure, tamper resistant, tamper evident and transparent audit log (also referred to as secure logging interchangeably) and also the capability to observe the processes within a component. While the strict requirement of audit logs is designed to increase the trust in the audit logs, many solutions in the prior art rely on centralized approaches to the storage and access to these audit logs. This is a shortcoming as it transfers the issue of trust from the audit log itself to the administrator of the audit log. Some prior art approaches for ensuring secure logging include using digital ledgers to secure and store audit data, such as the audit log. In this manner, the audit data is made transparent to members and is secured by the components of the distributed computing system themselves.

A digital ledger is a record of transactions stored in a computer. Transactions represent changes in the state of a system. Thus, digital ledgers represent the state of the system such as a financial system or the state of a general distributed system. Digital ledgers can be implemented in a centralized system that keeps a record of all the transactions and changes this record without requiring that another system agrees with its own record and without producing an auditable trail of changes made by the centralized system. Another method is a decentralized or distributed method that allows to keep a record of transactions and implements a method of determining a consensus between multiple systems. This is useful because it creates a disincentive for any particular system, comprising the distributed system, to act in a selfish manner and change the ledger in a way that compromises the distributed system. This in itself can increase user trust in the distributed computing system and for that reason can be useful.

One example of a digital ledger technology is a blockchain network. A blockchain is an append-only data structure consisting of blocks linked together using a linked list structure or similar. A block is a container for digital information, consisting of a header, metadata, and a list of transactions. The header and metadata can contain information about the software version, cryptographic hashes used to compress the amount of data required for storage, timestamps, and so on. The transactions are a list of all transactions of a digital token and may potentially be hashed to reduce the amount of data required for storage. A block lists all transactions from one user to another. Transactions between users are implemented via transactions between the users' corresponding digital addresses.

The blockchain data-structure facilitates a distributed system of nodes comprising a blockchain network to act as a single computer, enabling decentralized computation. Whereas computations within centralized systems are rarely logged and audited, the results of decentralized computations are recorded on the blockchain in the form of blockchain transactions, thus increasing trust in the computation. Computer programs describing a decentralized computation in the context of blockchain are known as smart contracts.

Smart contracts, in the context of blockchain networks, may be defined as executable computer programs, that define a set of rules, data, and relationships, that must be enforced on the execution of the smart contract. Smart contracts are immutable, in the sense that they cannot be manipulated once they are added to the distributed ledger architecture of the blockchain network that they are defined for. Further, invocation of smart contracts by nodes of the blockchain network results in transactions that are then recorded on the blockchain network. In some implementations, a group of related smart contracts is referred to as a chain code, which is used to deploy related smart contracts on the blockchain network.

One example of the blockchain network is the Bitcoin network. The blockchain networks known in the art, when compared to centralized networks, suffer from the problem of higher latency, lower throughput, and high computational cost of transactions, related to auditing of the computations carried out by various nodes.

Another example of a blockchain network is a permissioned blockchain network, also referred to as permissioned blockchain interchangeably hereinafter, which requires checking the access rights of each node that wants to be a part of the permissioned blockchain network. The permissioned blockchain network generally contains a control layer that runs on top of the blockchain network. Participants in the permissioned blockchain network can easily be removed from the network by simply revoking their permissions. In the permissioned blockchain network, a smart contract must be approved by all members of the permissioned blockchain network. Therefore, smart contracts act as trusted network services within the permissioned blockchain network and may be used as tools to ensure fault tolerance and removal capabilities for a node in the permissioned blockchain network. The node may comprise a networked computer, that may comprise all capabilities of a fully functional computing system. These capabilities include, among other things, a fully operational general-purpose operating system.

Modern general-purpose operating systems are monolithic kernels where high level virtual interfaces known as systems calls (syscalls) are provided, as an application programming interface (API), over the underlying computer hardware. Monolithic kernels have the dual purpose of freeing a programmer of the need to worry about the low level details of the underlying hardware and to provide security to the computing system by ensuring that processes that run on top of the kernel do not interfere with other processes or the kernel itself. The processes that run on top of the kernel form the user space and comprises a portion of memory that is allocated for running applications and libraries, and access to kernel is provided through syscalls. Kernels, such as monolithic kernels, on the other hand, reside in a portion of memory known as kernel space. In addition to providing syscalls, modern kernels also provide users with mechanisms to incorporate profiling and event logging, or to enable observability within the kernel, in the form of APIs known as kernel instrumentation. Examples of monolithic kernels include the major operating systems such as Linux® and OpenBSD®. The capabilities of a monolithic kernel in providing a secure and trusted environment for program execution, and restricted or privileged access to system resources through syscalls have not been explored fully, especially in the context of distributed computing systems.

Thus far, there has been no way to introduce accountability into a distributed computing system without requiring some nodes to have elevated privileges in the network and without trusted nodes (which again gravitate the whole system towards a centralized framework) responsible for the logging and monitoring of the audit data from participants or nodes in the distributed computing systems. Also, the problem of accountability still remains with nodes having elevated privileges only being responsible for maintaining trust in the network. The problem of accountability is also one of non-repudiation. Each node in the distributed computing system needs to be uniquely identifiable, in order to be accountable, trusted, and have non-repudiable responsibility for their actions.

Accordingly, there is a need for an efficient system for controlling the operation of the node or the system in an optimal and feasible manner, to provide enhanced security, auditability, accountability, and trust in the distributed computing system architectures.

SUMMARY

It is an objective of some embodiments to provide a robust and fault tolerant distributed computing system, which also ensures accountability, trust, auditability of transactions as well as of individual participants.

To that end, some embodiments of the present disclosure are based on consideration of the advantages of secure logging, tamper resistance and verifiability of audit data, access control, and decentralized architecture provided by permissioned blockchain networks. Additionally, the various embodiments disclosed herein leverage the advantages provided by smart contracts in identifying, isolating, and preventing malicious participants from threatening the integrity of the overall distributed computing system, and the use of permissioned blockchain architecture enables revoking of privileges (such as both read and write related privileges) of malicious participants to accomplish the objective of fault removal. Some embodiments also utilize kernel level instrumentation, through the use of syscalls, to identify malicious nodes further uniquely and to provide better transparency and auditability of the overall system.

Some embodiments provide a blockchain based method for introducing accountability into the distributed computing system by enabling identification of a faulty system, fault detection, and the removal of malicious participants in the distributed computing system without requiring that some nodes of the system possess any elevated network privileges.

Various embodiments provide systems and methods based on three components: (1) use of smart contracts as trusted network services, (2) use of participant categorization, and (3) permissioning of participants within the distributed computing system via the permissioning techniques provided by a permissioned blockchain network.

Some embodiments are based on the realization that smart contracts in permissioned blockchain networks must be shared amongst participants as source code and thus are trusted services within the permissioned blockchain network that do not require nodes with elevated network privileges. Due to this trust, smart contracts can be used as the mechanism to record audit data for publishing on the permissioned blockchain network that is trusted by all participants. The audit data for each participant is obtained through the use of kernel level instrumentation, provided by APIs that enable the user to observe and log processes and data structures within the kernel. This contributes to fault prevention since the logging and publishing of audit data that is trusted by all participants increases the cost of malicious behavior.

Some embodiments are based on the realization that in blockchain systems, each transaction must be signed by some private key belonging to a participant. This, in addition to the design decision to use permissioned blockchain frameworks, can be used to satisfy the fault tolerance property since participants in a permissioned blockchain network must have their identities recorded in the system; this enables the assignment of non-repudiable responsibility for misbehavior. Finally, fault removal is simple in a permissioned blockchain system since offending or malicious nodes can be easily removed by revocation of their permissions to participate in the blockchain network (such as the permissioned blockchain network).

Some embodiments are based on understanding that the use of a permissioned blockchain network for auditing the operations of a node and as permission control framework for nodes within a distributed system greatly increases both the trust and the robustness of a distributed system that would not be possible if computations were done on top of the blockchain network.

Some embodiments are based on the recognition that publishing a verifiable record of the activities of the node within the distributed computing system is less computationally intensive than repeating a computation on every node within the blockchain network. Thus, the systems and methods disclosed herein provide substantial savings in terms of computational cost and enhanced efficiency for providing a robust, accountable, secure, and trustworthy distributed computing system.

In accordance with some embodiments, a system and method for implementing a distributed computing system with fault detection and removal capabilities is provided. The distributed computing system comprises at least one blockchain-enabled networked computer, which is in communication with one or more different networked computers through a permissioned blockchain network.

The blockchain-enabled networked computer comprises general system components including at least one processor, a memory, an operating system stored in the memory, and one or more instructions stored in the memory which are executable by the at least one processor to carry out various operations. The memory may be partitioned into a kernel space and a user space. The memory may further store the instructions which when executed by the at least one processor, cause the networked computer to compile and execute a smart contract. The smart contract may be a computer program which is common for all the networked computers which are part of the permissioned blockchain network. The smart contract comprises a set of rules which are used to define a series of operations including at least one of: appending transactions into the permissioned blockchain network, wherein the transactions include logs indicative of exchanging of messages between the networked computers having access to the permissioned blockchain network, detecting malicious behavior of the networked computer in reaching a consensus with the other participants of the permissioned blockchain network, and revoking the access of the networked computer to the permissioned blockchain network upon detecting the malicious behavior, or a combination thereof. The detection of the malicious behavior is done on the basis of kernel instrumentation of the networked computer, as enabled by the smart contract. Further, once the smart contract has been compiled and executed, a distributed program is executed in order to reach a consensus with the other networked computers having access to the permissioned blockchain network.

Some embodiments are based on a recognition that the different networked computers, which are participants of the permissioned blockchain network may categorized into at least one of two types of participants: (1) observers, and (2) operators. Observers are the participants or nodes of the permissioned blockchain network that may be required to run at least one blockchain node in order to replicate the blockchain containing audit data from the participants in the particular (sub)network. Observers participate in the consensus process by proposing one or more transactions for the permissioned blockchain network. The other type of nodes are operator nodes, which participate actively in the consensus process by conducting transactions.

Some embodiments are based on a recognition that the smart contract is configured to detect malicious behavior of a node in the permissioned blockchain network based on analysis of one or more audit logs generated by the networked computer in response to execution of the smart contract and the corresponding transactions of the permissioned blockchain network.

Some embodiments are based on the realization that malicious behavior occurs when the networked computer tries to communicate different values of a message to different nodes or networked computers which are connected on the permissioned blockchain network.

Some embodiments are based on the realization that the smart contract may be distributed to the nodes of the permissioned blockchain network in the form of at least one of a source code file or a trusted binary file.

It is an objective of some embodiments to deploy the smart contract as part of kernel instrumentation activities performed on the networked computer. The kernel instrumentation is performed by logging results of audits performed by different types of syscall requests using the smart contract, which is then published on the permissioned blockchain network. When the logs indicate malicious alteration of user space programs, which is identified by inspecting the audit data associated with one or multiple types of syscalls requests, the malicious participant of the permissioned blockchain network is identified and isolated.

Further, in some embodiments, the malicious participant is removed from the permissioned blockchain network by revoking all permissions associated with the malicious participant.

BRIEF DESCRIPTION OF THE DRAWINGS

FIG. 2A illustrates a block diagram showing a separation between a user space and a kernel space, according to some embodiments of the present disclosure.

DETAILED DESCRIPTION

In the following description, for purposes of explanation, numerous specific details are set forth to provide a thorough understanding of the present disclosure. It will be apparent, however, to one skilled in the art that the present disclosure may be practiced without these specific details. In other instances, apparatuses and methods are shown in block diagram form in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Furthermore, it is to be understood that the phraseology and terminology employed herein are for the purpose of the description and should not be regarded as limiting. Any heading utilized within this description is for convenience only and has no legal or limiting effect.

Figure 1A:
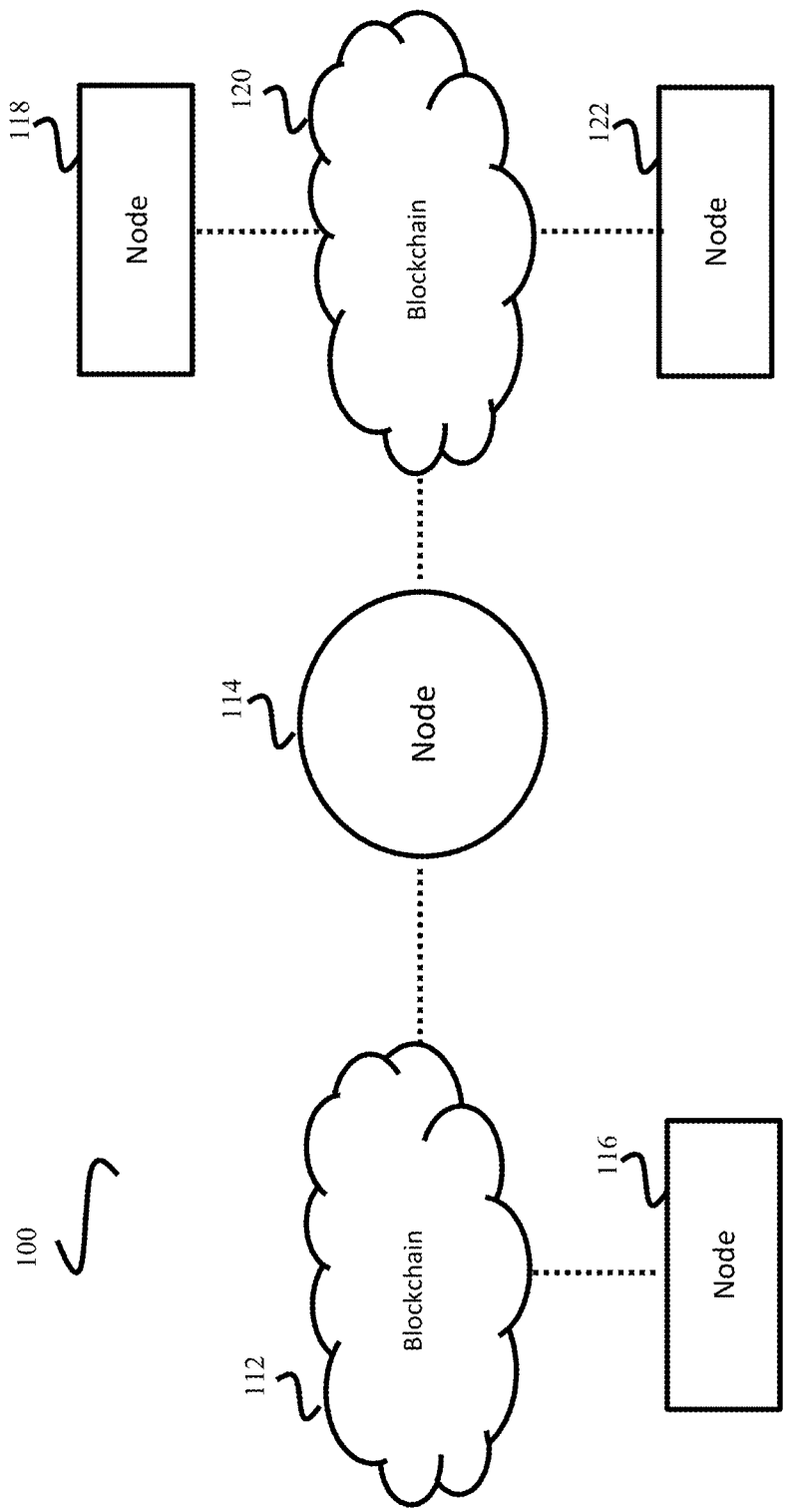
FIG. 1A illustrates a block diagram showing an architecture of a permissioned blockchain system for fault detection and removal, according to some embodiments of the present disclosure.

FIG. 1A illustrates a block diagram showing an architecture of a permissioned blockchain system 100 for fault detection and removal, according to some embodiments of the present disclosure. The system 100 comprises one or more blockchain networks, such as a blockchain network 112, and a blockchain network 120. The system 100 further comprises a plurality of nodes such as a node 114, a node 116, a node 118, and a node 122. The node 114, the node 118, and the node 122 are associated with the blockchain network 120. The node 116 is associated with and is a part of the blockchain network 112. Each of the plurality of nodes may be a networked computer. Further, each of the networked computer may in turn be a blockchain-enabled networked computer.

As illustrated in FIG. 1A, a node may be a part of more than one network. For example, the node 114 is a part of the blockchain network 112 as well as the blockchain network 120. It may be understood by one of ordinary skill in the art that the networks 112 and 120 are shown as blockchain networks only for purpose of specific embodiments described herein. The term blockchain represents a network architecture that implements a distributed computing network, which has decentralized control of operations and transactions within and involving the distributed computing network. Therefore, the nodes 114, 116, 118, and 122 may be nodes of such a distributed computing network, one specific type of which is the blockchain network, with all its enabling technologies. Further, in some embodiments, the blockchain network is a permissioned blockchain network, having an access layer on top of the blockchain layer, which defines various permissions available to the different nodes that are part of the permissioned blockchain network.

The permissioned blockchain network architecture itself has many advantages, such as providing secure logging facility for audit logs associated with the nodes on the permissioned blockchain network through the use of a separate blockchain backbone, and providing a trust based and secure distributed computing architecture. At the same time, the permissioned blockchain architecture provides fault tolerance, fault prevention, and fault removal capabilities, which make it a highly accountable architecture for implementing distributed (decentralized) computing systems.

The nodes of the permissioned blockchain system 100 may be referred to as the participants of the system, and may be partitioned into two broad categories: observers, and operators. Additionally, there may also be ordering nodes and lightweight clients in the permissioned blockchain system 100, as will be discussed later in the description of various embodiments provided herein.

Observers are nodes that do not necessarily create transactions, but are responsible for detection, identification, and removal of malicious participants of the system. The observers also contribute towards reaching consensus in the permissioned blockchain system 100, and are capable of replicating the blockchain backbone of the permissioned blockchain system 100, through which they run audits on the participants of permissioned blockchain system 100. In FIG. 1A, the node 114 is an observer node that runs a single node that is part of two blockchain subnetworks 112 and 120. Observers increase the fault tolerance of the permissioned blockchain system 100 by detecting faults in the permissioned blockchain system 100 and also by identifying malicious participants of the permissioned blockchain system 100.

The other types of nodes in the permissioned blockchain system 100 are the operators. Operators are nodes that construct transactions for inclusion in a blockchain system, such as the permissioned blockchain system 100. Operator nodes are required to prove their trustworthiness by recording their operations on the permissioned blockchain system 100 for public auditing using smart contracts. The operators also increase fault tolerance of the permissioned blockchain system 100 by reporting their audit data to the permissioned blockchain system 100. Referring to FIG. 1A, the nodes 116, 118, and 122 are the operator nodes that are connected to blockchain (sub)networks 112 and 120.

In some embodiments, the permissioned blockchain system 100 may comprise a distributed system in which the participants that do not entirely trust each other can trust and participate in. An example of this is an intra-organizational network consisting of a corporation and its subsidiaries, which is illustrated further in FIG. 1B.

Figure 1B:
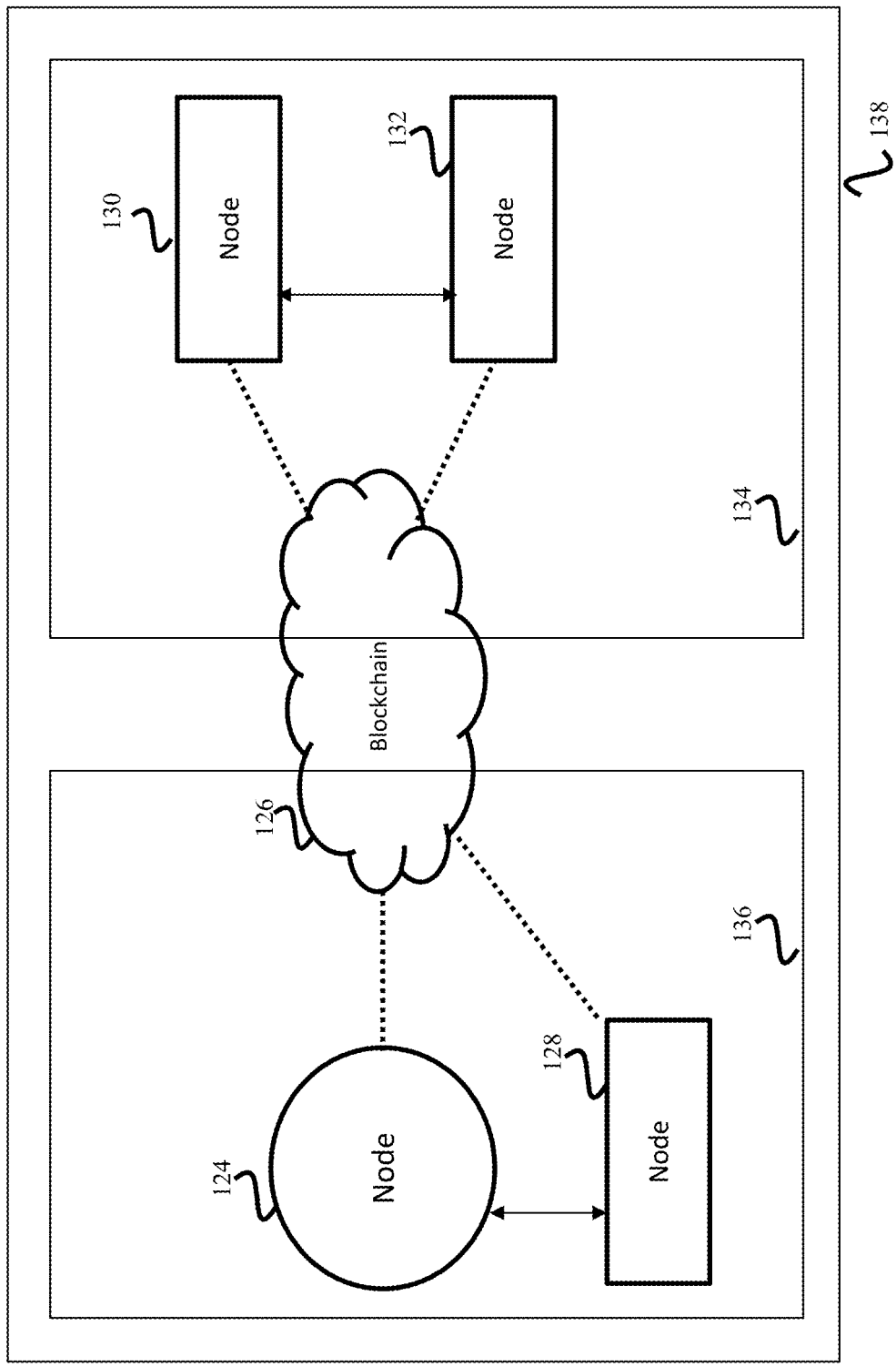
FIG. 1B illustrates a block diagram of a permissioned blockchain system comprising different types of nodes, according to some embodiments of the present disclosure.

FIG. 1B illustrates a block diagram of a permissioned blockchain system 126 comprising different types of nodes, according to some embodiments of the present disclosure. The permissioned blockchain system 126 comprises a plurality of participants (or nodes) belonging to an organization represented by a bounding box 138 (also referred as "organization" 138). Further, a bounding box 136 represents a parent organization that consists of two nodes: an observer node 124 and a regular or operator node 128 that commits audit data to the permissioned blockchain system 126. The nodes 124 and 128 are able to communicate with each other since they are both within the parent organization 136. The organization 138 also comprises a subsidiary organization 134 consisting of two nodes 130 and 132 whose operations are audited and committed to the permissioned blockchain system 126. FIG. 1B illustrates only one type of enabling environment for the permissioned blockchain system 100 of FIG. 1A. Another enabling example (not shown in the figure) includes real-time and automated auditing of a subset of participants in the permissioned blockchain system 100 that can be trusted by all participants. Each participant in the permissioned blockchain system 100 may be one of four types described earlier: the observer, the operator, the ordered, and the lightweight client as mentioned earlier. The operator and the observer have already been described in conjunction with FIG. 1A earlier. The lightweight client is described in the following description of FIG. 1C.

Figure 1C:
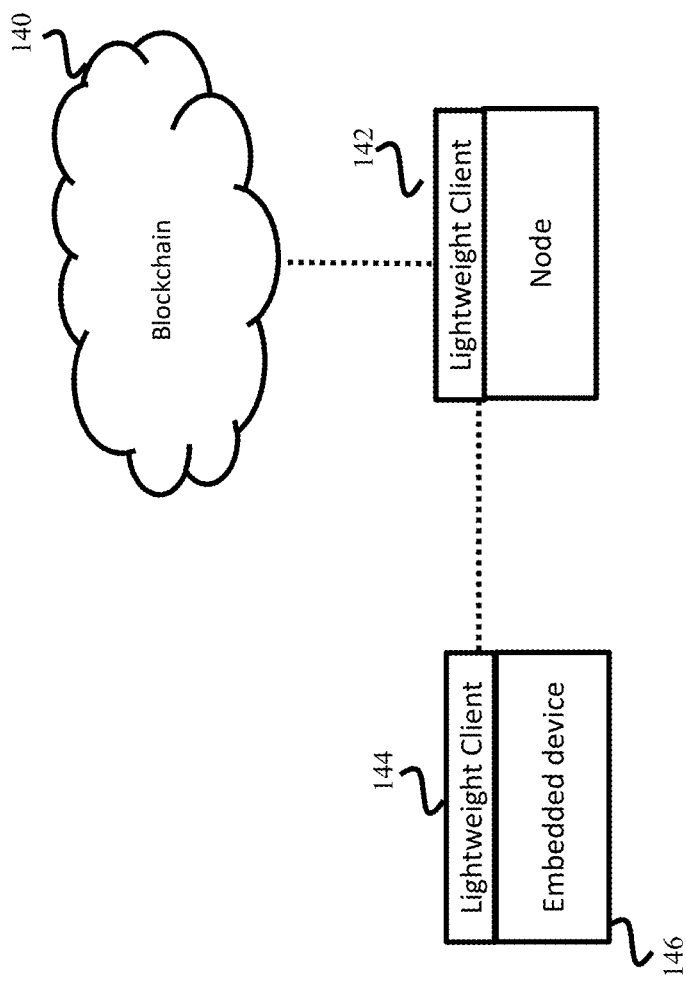
FIG. 1C illustrates a block diagram of a permissioned blockchain system comprising a lightweight client node, according to some embodiments of the present disclosure.

FIG. 1C illustrates a block diagram of a permissioned blockchain system 140 comprising a lightweight client node, according to some embodiments of the present disclosure. The permissioned blockchain system 140 comprises two lightweight client nodes, such as a lightweight client 142 and a lightweight client 144. The lightweight client 144 further comprises an embedded device 146.

The lightweight clients 142 and 144 may comprise any modern computer, such as an embedded computer, a laptop, a mobile phone, a smartphone, a tablet, a smart watch, a wearable computer, a point of sale (POS) terminal, a kiosk, a routing device, a monitoring terminal at a power plant, an electronic meter and the like. Some embodiments are based on the realization that many modern computers are embedded devices with limited computational power, such as the lightweight client 144 associated with the embedded device 146, which makes them incapable of storing a full copy of the blockchain that they are part of. However, using the embodiments and the architecture of the permissioned blockchain system 140, even these lightweight systems with low computational power may be completely trusted, secure and efficiently monitored for any malicious behavior. This may be possible due to the combination of smart contracts and kernel instrumentation technologies implemented in the permissioned blockchain system 100 (or equivalently the permissioned blockchain system 140), disclosed in the various embodiments described herein.

Figure 1D:
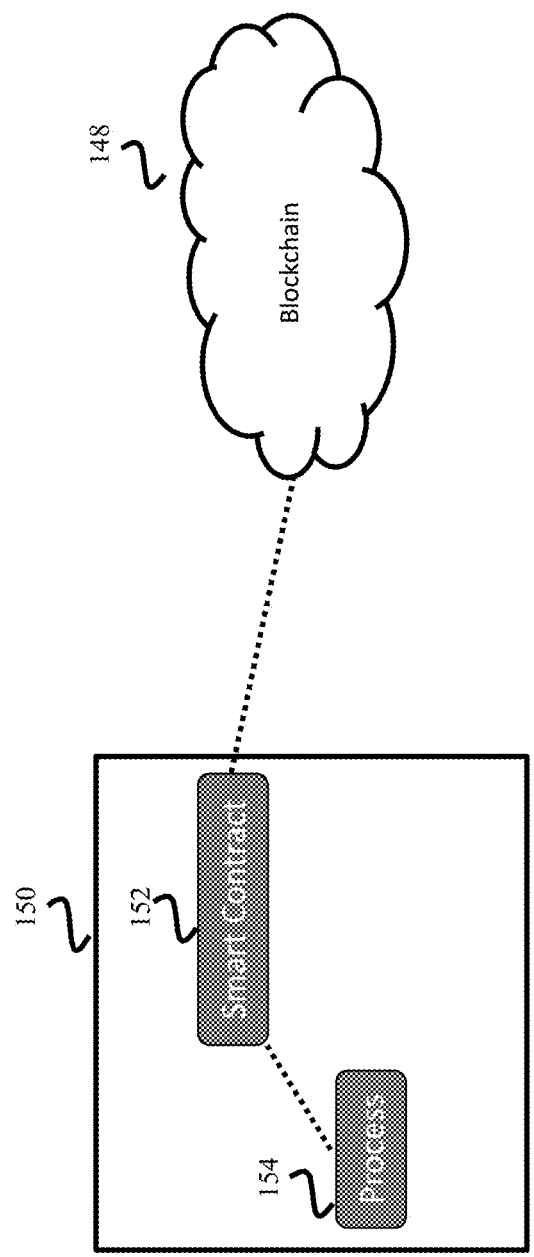
FIG. 1D illustrates a block diagram of a permissioned blockchain system comprising a smart contract, according to some embodiments of the present disclosure.

FIG. 1D illustrates a block diagram of a permissioned blockchain system 148 comprising a smart contract 152, according to some embodiments of the present disclosure. The permissioned blockchain system 148 comprises a node 150, which may be a blockchain enabled networked computer, which may be in communication with other networked computers (not shown herein). The node 150 may be configured to compile and execute the smart contract 152, as part of auditing formalities for the node 150. The smart contract 152 may be associated with a process 154. The smart contract 152 may be configured to detect malicious behavior associated with the node 150 based on analysis of one or more audit logs generated by the node 150 in response to execution of the smart contract 152 and the corresponding transaction of the permissioned blockchain network 148.

To that end, the smart contract 152 is configured to detect the malicious behavior of the node 150 when the node 150 communicates different values of the same message to different other nodes (or networked computers) having access to the permissioned blockchain network 148.

Various embodiments enable the deployment of the smart contract 152 on the permissioned blockchain network 148 by distributing to members (such as node 150) of the permissioned blockchain network 148, the source code of the smart contract 152 or a trusted binary file associated with a compiled smart contract 152. When the source code of the smart contract 152 is distributed to all the nodes of the permissioned blockchain network 148, then the each of the nodes may then locally compile the smart contract 152. This ensures that the smart contracts act as a trusted, transparent, tamper resistant, robust tool for ensuring fault tolerance of the permissioned blockchain network 148. This is because, the smart contract 152 by itself is immutable, so any malicious behavior associated with deviating from acceptable rules, permissions, or operations allowed on the permissioned blockchain network 148 occurs at a lower level (such as at the kernel level), greatly increasing its cost.

Further, the smart contract 152 associated with the process 154 may be used to audit the process 154 by defining a set of rules defining acceptable data types, operations, dependencies and packaging information for data associated with the process 154. Thus, each invocation of the process 154 may also invoke the smart contract 152 and execution of its corresponding rules. Any deviation from the rules may be identified by performing instrumentation at the kernel level of the node 150 and is recorded on the permissioned blockchain network 148. Auditing of this recorded information detects attempts at malicious behavior on part of the node 150. Thus, the node 150 is identified and isolated, and further, the permissions associated with the node 150 may be revoked to remove the malicious node from the permissioned blockchain network 148 altogether.

In some embodiments, the smart contract 152 includes rules for network based policy enforcement which define proper configuration for the node by triggering local events. The response to the trigger is recorded on the blockchain based on rules specified in the smart contract 152.

To that end, the node 150 may be at least one operator node or an observer node (wherein the functionalities of the operator node and the observed node have been discussed earlier). When the node 150 is an observer node, the node 150 may be configured to replicate a blockchain of all the permissioned (sub)networks the observer node is a member. The node 150 may be a part of one or more permissioned blockchain (sub)networks, as disclosed earlier in conjunction with FIG. 1A. When the node 150 is part of more than one permissioned blockchain (sub)networks, each of these permissioned blockchain (sub)networks have at least one common observer node with another subnetwork.

In some embodiments, the node 150 is configured as an operator node to provide audit details of its operation by submitting its kernel instrumentation data (in response to execution of its smart contract 152) uploaded to the permissioned blockchain network 148 by the deployed smart contract 152.

In some embodiments, when the node 150 is configured as an operator node, the node 150 is further associated with a physical terminal configured for allowing human interaction, and further wherein the smart contract 152 is configured to provide permissioning for human operators of an organization. This will be discussed in detail in FIG. 6 and its associated description.

Various embodiments further provide that the node 150 is configured to exchange messages with other nodes in the permissioned blockchain network 148 to coordinate the actions of all the nodes that are part of the permissioned blockchain network 148. This coordination is in turn done to reach a consensus among all the nodes in the permissioned blockchain network 148 regarding a current state of the permissioned blockchain network 148, in accordance with a distributed computing program, known generally as a consensus algorithm. One example of the consensus algorithm that may be used by the permissioned blockchain network 148 to reach the consensus is a practical byzantine fault tolerant (PBFT) algorithm, in which a node is configured to receive confirmations from all other nodes in the permissioned blockchain network 148 regarding validity of the node's transactions. The consensus is then reached based on the total number of confirmations received by the node.

Some embodiments disclosed herein are based on the understanding that the observer nodes help in reaching consensus by proposing transactions for all the nodes of the permissioned blockchain network 148. Furthermore, the transactions proposed by the observer nodes are subjected to auditing and recording of results of auditing on the permissioned blockchain network 148 as per a set of common rules specified in a smart contract, such as the smart contract 152.

Various embodiments provide that the smart contract 152 is stored on the node 150 as part of the node's application space, and further is deployed as part of the kernel instrumentation of the node 150. This will be discussed in further detail in conjunction with FIGS. 2A-2C.

FIG. 2A illustrates a block diagram showing a separation between a user space 200 and a kernel space 202 associated with the node 150, according to some embodiments of the present disclosure.

The user space 200 comprises a portion of a memory of the node 150 (which a computing component having a memory and a processor) which stores user programs, such as application programs, application data, APIs, software or code libraries, stored procedures, algorithms, computer instructions, user files and the like. The user programs in the user space 200 are generally written in any of the known high level languages, such as C#, C++, Java, Python, Solidity, JavaScript, and the like. The user space 200 also includes various processes, such as business processes or network interface processes, which define algorithms and logic instructions for carrying out one or more functions. The functions are application specific. One of the types of user programs in the user space 200 is a smart contract 204 (which is equivalent to the smart contract 152 shown in FIG. 1D). The smart contract 204 defines enforceable rules which are executed on execution of the smart contract 204. The execution of the smart contract 204 in turn may invoke one or more processes, which require access to system's (operating system) resources. The system resources are stored in a separate portion of memory from the user space 200, which is known as the kernel space 202.

The kernel space 202 defines a portion of a memory where core of the node 150, in the form of an operating system and its related programs, is stored. The kernel space 202 stores specialized programs which enable interfacing of various system resources, such as hardware and file system. The kernel space 202 may include specialized programs and data such as device drivers, memory management programs, I/O management programs, process management programs, and the like. Generally, kernel space programs are written in a low-level language, such as C.

The system resources encompassed by the kernel space 202 may be accessed from user space 200 processes through specialized requests sent to kernel space 202 in the form of a system call or syscall. Each resource access requires a separate syscall. Furthermore, each syscall and its associated system resource may be monitored through the use of specialized technologies known as kernel level instrumentation technologies. The kernel level instrumentation technologies enable observability of code, gathering of performance metrics, and tracing security related events among other things. This is discussed in further detail in conjunction with FIGS. 2A and 2B.

Figure 2B:
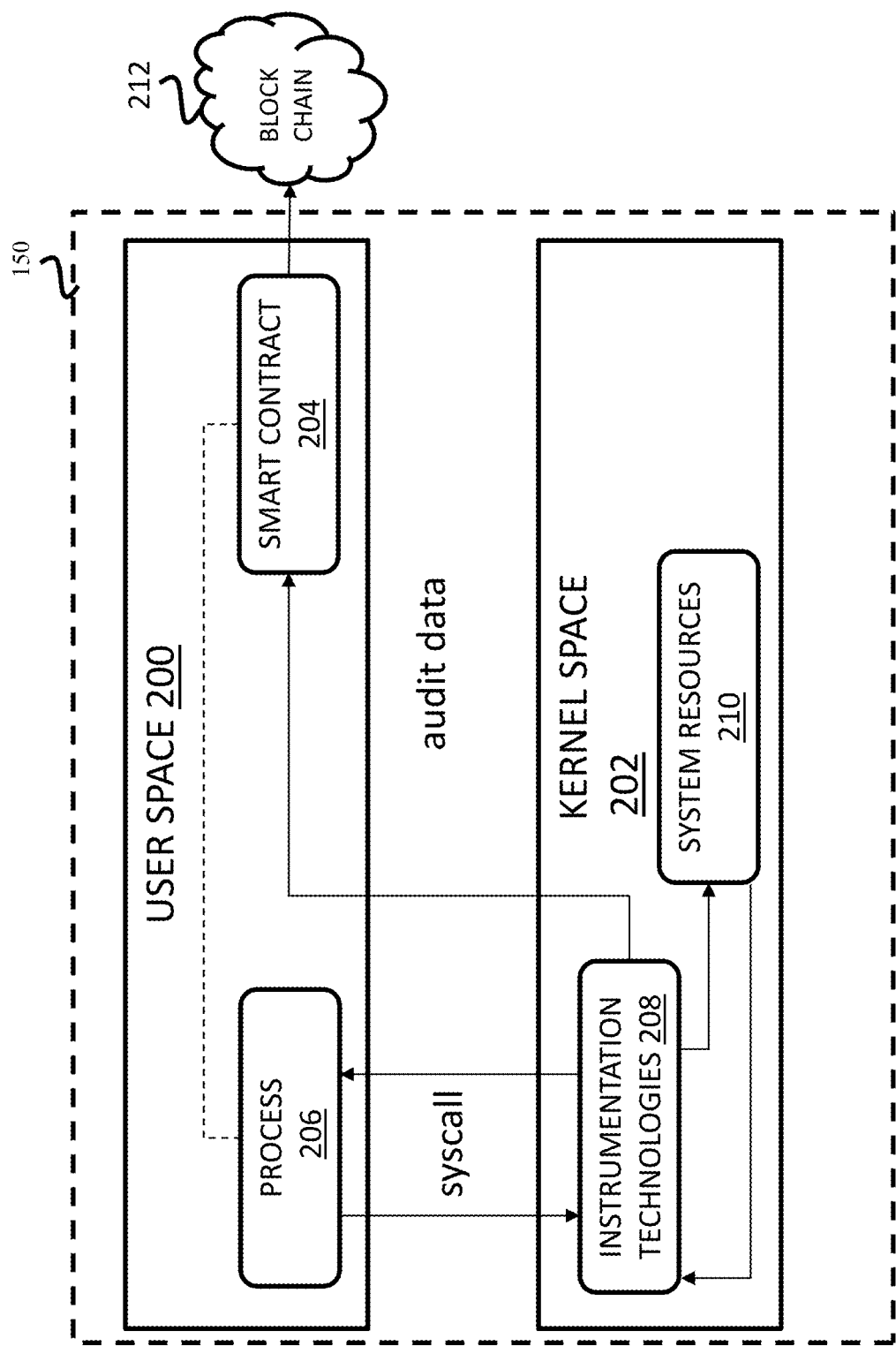
FIG. 2B illustrates a detailed block diagram showing components of user space and kernel space illustrated in FIG. 2A, according to some embodiments of the present disclosure.

FIG. 2B illustrates a detailed block diagram showing components of the user space 200 and the kernel space 202 illustrated in FIG. 2A.

As can be seen from FIG. 2B, any process 206 in the user space 200 can only access system resources 210 stored under the ambit of kernel space 202 through one or more syscalls.

Figure 2C:
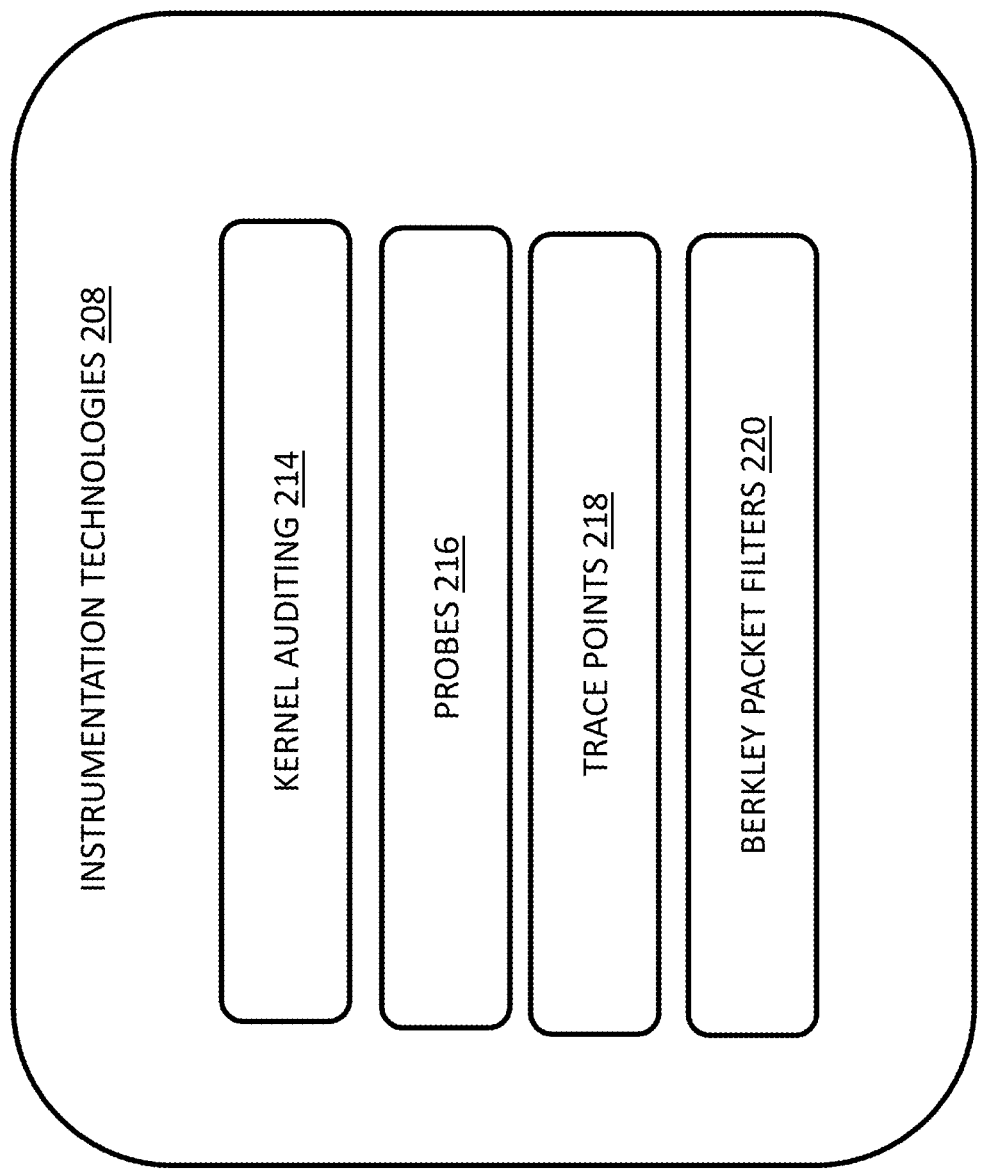
FIG. 2C illustrates a detailed block diagram showing instrumentation technologies used for auditing kernel space data, according to some embodiments of the present disclosure.

Various embodiments described herein provide for auditing of syscalls based on the rules specified in the smart contract 204, which is the deployed smart contract associated with a permissioned block system 212 (which is equivalent to permissioned blockchain systems described in previous FIG. 1A-FIG. 1D). The auditing of the syscalls is done on the basis of any of the instrumentation technologies known in the art. FIGS. 2B and 2C depict some known instrumentation technologies 208 considered for exemplary purposes in the various embodiments described herein.

The instrumentation technologies 208 shown in detail in FIG. 2C include kernel auditing 214, probes 216, trace points 218, and Berkley packet filters 220. Only four instrumentation technologies 208 are depicted in FIG. 2C for exemplary purpose. Any number of instrumentation technologies may be added to the list of the instrumentation technologies 208 without deviating from the scope of the present disclosure.

Kernel auditing 214 comprises an audit sub-system, which is a pre-configured rules based framework for system auditing and security functions. The kernel auditing 214 sub-system is configured for capturing a wide range of system events and their associated metadata including, but not limited to, file system auditing, syscall auditing, trusted database access. Attempts to import/export functions and other predefined events. The sub-system comprises 1) a kernel component for generating audit records, 2) a user space daemon for logging of the audit records to a local file or to an external server, and 3) a set of user space tools for inspecting and processing audit logs.

The probes 216 are dynamic instrumentation enablers where kernel modifies assembly language level code in kernel space (kprobes) or in user space (uprobes) at runtime by attaching a breakpoint and a handler function. Probes are configured for logging a state of the operating system of the node 150 and its processes.

The trace points 218 include a system for observation instrumentation where hooks that call a function that can be specified during runtime, are inserted at important locations within the code. The trace points 218 are activated when a particular code path is reached, and the corresponding kernel API exposes some predefined events.

The Berkley packet filters (BPF) 220 are a set of technologies for system level instrumentation. Implementation of BPF requires three key components: 1) an in-kernel virtual machine with its own virtual instruction set known as BPF bytecode; 2) a kernel runtime consisting of an interpreter, a verifier for safety of BPF programs, and a just in time (JIT) compiler for conversion of BPF bytecode into native instructions; 3) a custom key-value data structure known as BPF maps for data sharing between the kernel space 202 and the user space 200. The BPF helps in monitoring of loading of kernel modules, process crashes, page fault errors, pseudo usage, SSH authentication, crypto initialization, shell commands, and the like.

Various instrumentation technologies 208 disclosed herein enable auditing of one or more syscalls, such that the invocation of one or multiple types of system call (syscall) requests are automatically logged by the smart contract 204 for publishing on the permissioned blockchain network 212.

Thus, the smart contract 204 is deployed as part of kernel instrumentation (using any of the kernel instrumentation technologies 208 described above) of the node 150, wherein malicious alteration of programs in user space 200 may be detected by inspecting the permissioned blockchain network 212 containing audit data associated with one or multiple types of system call requests.

If the node 150 is identified as malicious, based on the inspection of its submitted audit data, the permissions of the node 150 to access the permissioned blockchain network 212 may be revoked. Thus, the use of permissioned blockchain network 212 architecture, smart contract 204 and kernel instrumentation technologies 208 in the manner described above enables fault detection, fault removal and secure logging facilities, which make the overall system associated with the node 150 and the permissioned blockchain network 212 highly accountable.

Figure 3:
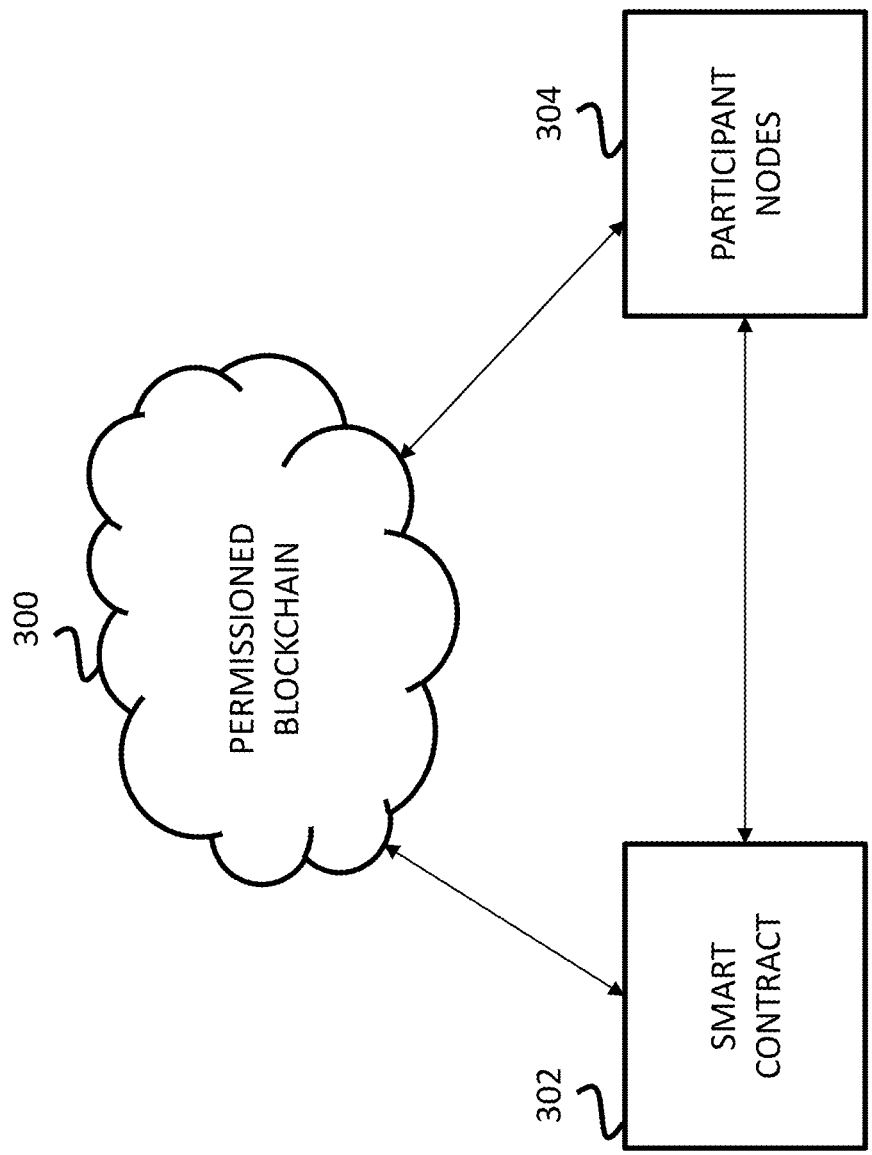
FIG. 3 illustrates a high level block diagram of a permissioned blockchain system, according to some embodiments of the present disclosure.

FIG. 3 illustrates a high level block diagram of a permissioned blockchain system 300, according to some embodiments of the present disclosure. Various embodiments described herein provide an accountable distributed system, which is based on the permissioned blockchain network 300. The major components of such a system are the permissioned blockchain network 300, a smart contract 302, and underlying participant nodes 304.

The underlying participant nodes 304 are one or more networked computers, which are blockchain enabled. Each node of the participant nodes 304 could be a part of one or more blockchain (sub)networks. Furthermore, each node of the participant nodes 304 may be one of the four types of nodes such as the observer, the operator, the orderer, and the lightweight client. Crucially, the participant nodes 304 are classified into the operators and the observers.

The observers correspond to a class of the participant nodes 304 which do not have processes that require auditing and thus, they do not create transactions that need to be added to the permissioned blockchain network 300. Instead, the observers run nodes to replicate the blockchain for carrying out audits on participants of the blockchain network that they replicate. The observer nodes perform functions, including but not limited to, increasing redundancy and security of the permissioned blockchain network 300 through audits, detecting and removing malicious participants from the permissioned blockchain network 300, and running ordering services to append to the blockchain according to the transactions provided by smart contract 302. The observer nodes provides advantages such as increasing fault tolerance of the overall permissioned blockchain network 300, and also increasing fault prevention capabilities of the overall permissioned blockchain network 300 because the observer nodes are also configured for removing malicious participants from the permissioned blockchain network 300 by revoking their access privileges for the permissioned blockchain network 300.

The other major classification of the nodes of the permissioned blockchain network 300 are operators. Operators are the nodes that have processes which require auditing. This may be accomplished by recording the operations of the operator nodes on the permissioned blockchain network 300 based on the rules specified in the smart contract 302. Furthermore, the operations of the operator nodes are audited using kernel instrumentation technologies 208 as described in FIG. 2C.

The participant nodes 304 of the permissioned blockchain network 300 may contain at least one observer node, to make the permissioned blockchain network 300 an accountable (distributed) system.

Various embodiments disclosed herein provide permissioning management functionality for all the nodes on the permissioned blockchain network 300. The permissioning management functionality includes at least one process related permissions, node related permissions, and human interface related permissions or a combination thereof.

The process related permissions comprise identifying, using kernel instrumentation technologies 208, whether a process within a kernel possesses proper permissions to access system resources. This was outlined in conjunction with FIG. 2B. This is implemented through any of the kernel instrumentation technologies 208 described earlier.

The node related permissions comprise checking if a node is permissioned to participate in a distributed computing system, such as the permissioned blockchain network 300. This is done by the requirement of blockchain network framework that a node with sufficient permissions is approved by all participants, while a node with a lack of sufficient permissions is not allowed to participate. Additionally, the node related permissions are recorded in a number of network configuration files available to the nodes in the permissioned blockchain network 300.

The human interface related permissions comprise permissions associated with a human operator interfacing with a node through a physical interface terminal. This is required in scenarios where a computing device or a networked computer associated with the permissioned blockchain network 300 is trusted, but is shared among a number of human operators, who may not all be trustworthy. Thus, the human interface related permissions ensure that the permissions allotted to human operators interacting with the networked computer are not tied to the setup of the networked computer and can be changed by an organization (of which the networked computer or node is a part of) in real time. This may be implemented by use of a Lightweight Directory Access Protocol (LDAP). This will be described in further detail in conjunction with FIG. 6.

The architecture of the permissioned blockchain network 300 may be implemented using a number of different scenarios, as will be discussed in the following figures and their associated description.

Figure 4:
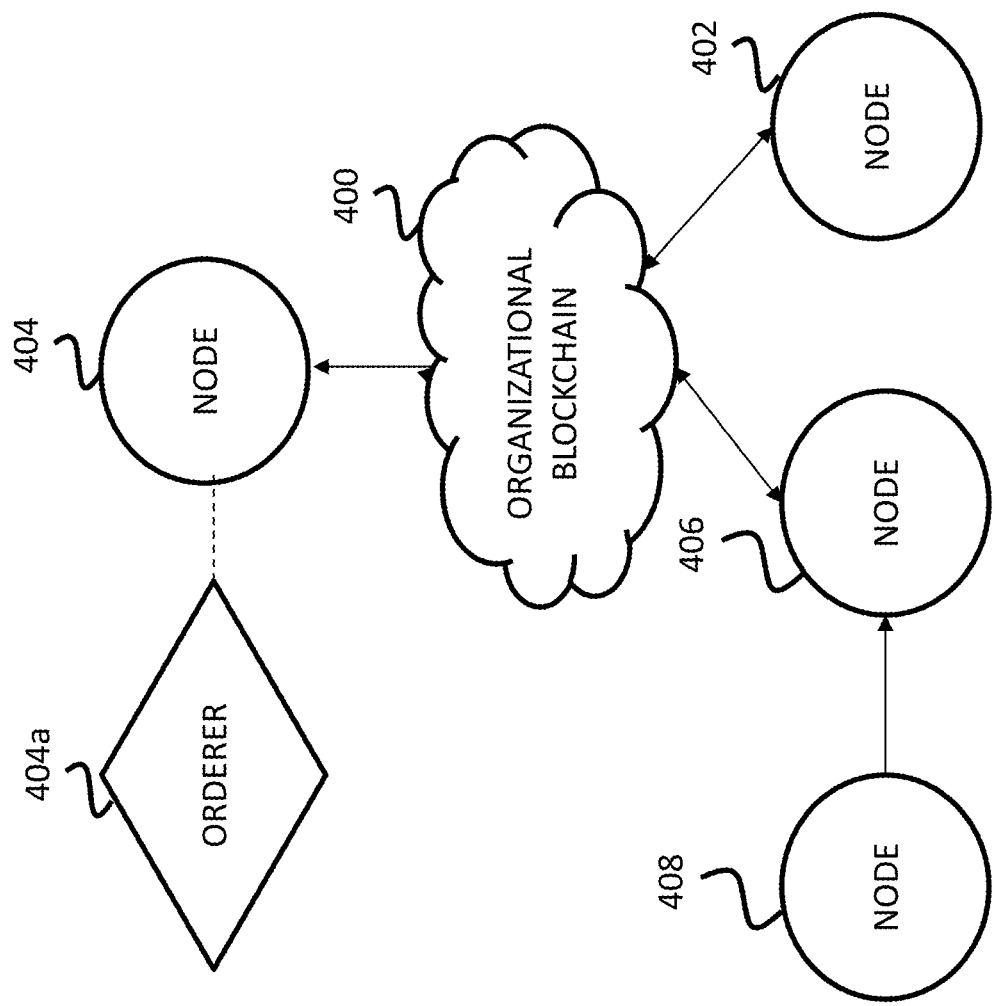
FIG. 4 illustrates a high level block diagram of an organizational blockchain system, according to some embodiments of the present disclosure.

FIG. 4 illustrates a high-level block diagram of an organizational blockchain system 400, according to some embodiments of the present disclosure. The organizational blockchain system 400 comprises a permissioned blockchain network as part of the organizational blockchain system 400, having a plurality of nodes or blockchain enabled networked computers associated with the organizational blockchain system 400. FIG. 4 illustrates four such nodes, a parent node 404 and its associated orderer service 404a, and one or more child nodes: a node 402, a node 406, and a node 408. It may be understood by one of ordinary skill in the art that the particular number of nodes, shown in the system, is only for exemplary purposes. Any number of nodes may be associated with the organizational blockchain system 400 without deviating from the scope of the present disclosure.

The parent node 404 may be associated with a parent organization, which acts as an orderer node running the orderer service 404a for ordering auditing of the other nodes (such as the child nodes 402, 406, and 408) associated with the organizational blockchain system 400. The interaction of the node 404 with the organizational blockchain system 400 may be read-only. Also, the parent node 404 may be configured to synchronize a complete copy of the organizational blockchain system 400 by participating in a consensus algorithm associated with the organizational blockchain system 400 by proposing transactions. The consensus algorithm ensures that all the nodes of the organizational blockchain system 400 agree about a present state of the organizational blockchain system 400.

Furthermore, the child nodes may be associated with child organizations, such as subsidiaries of the parent organization, which need to be monitored. Each of the child nodes may be capable of both reading and writing to the organizational blockchain system 400. The node 402 and the node 406 act as operating nodes, which may be configured for getting their processes audited through the combination of smart contracts and kernel instrumentation technologies described earlier, and are also configured to actively participate in the consensus algorithm by generating transactions containing audit data.

Further, as illustrated in FIG. 4, the child node 408 may communicate with the organizational blockchain system 400 through the child node 406, for example, when the child node 408 is a lightweight client device not capable of running a full blockchain enabled node.

The functionalities of various nodes and services related to blockchain framework may be implemented through the use of APIs and code libraries, which may be known to those of ordinary skill in the art.

Figure 5:
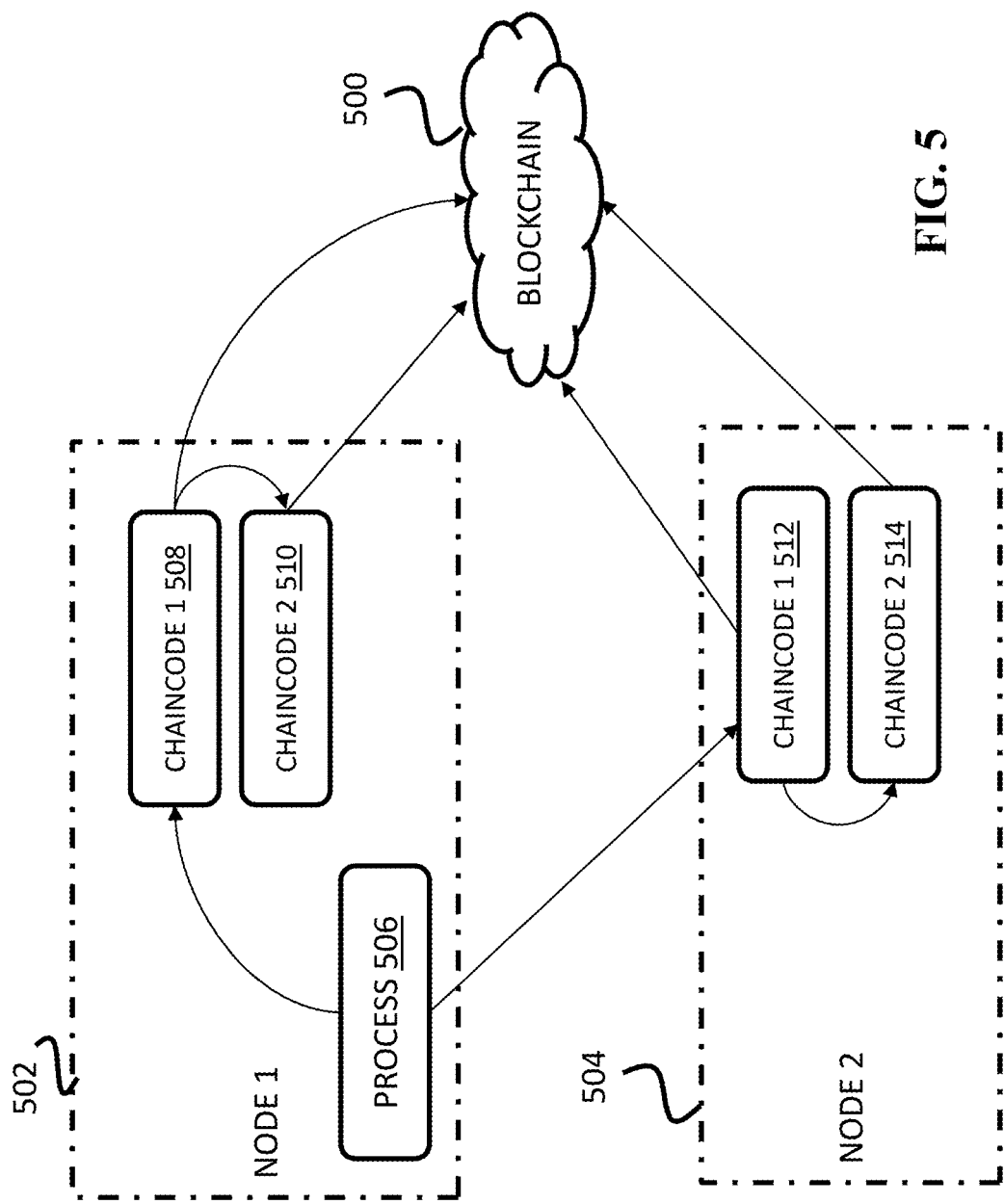
FIG. 5 illustrates a detailed block diagram of different nodes in a permissioned blockchain system, according to some embodiments of the present disclosure.

FIG. 5 illustrates another block diagram of a scenario showing different nodes in a permissioned blockchain system 500, according to some embodiments of the present disclosure. The permissioned blockchain system 500 may be associated with one or more nodes, such as a node 502 and a node 504. The node 502 may be an operator node running a process 506 which needs auditing. The invocation of the process 506 may further lead to invocation of chain code 508 on the node 502 and the chain code 512 on the node 504. As already discussed, a chain code is a set or a group of related smart contracts. Then, using the rules defined in the chain code 508 and the chain code 512, the transactions of the nodes 502 and 504 may be monitored at the kernel level, through the use of any known kernel instrumentation technologies some of which have been described earlier in FIG. 2C. Further, the invocation of the chain code 508 may lead to invocation of chain code 510, and the invocation of the chain code 512 may lead to invocation of chain code 514, the results of which may be recorded on the permissioned blockchain system 500. Further, the result of the invocation of the chain code 508 and the chain code 512 (in the form of a result of auditing using kernel instrumentation technologies) may be recorded on the permissioned blockchain system 500.

The invocation of related chain codes on the permissioned blockchain system 500, in the manner illustrated in FIG. 5, may provide cross-chain code invocation functionality, which may further provide automation of some of the auditing functions enabled using smart contracts and chain codes. Thus, using the exemplary embodiment discussed in FIG. 5, the permissioned blockchain system 500 may be used to provide fault detection and accountable distributed computing system in a semi-automated or a fully-automated manner.

Figure 6:
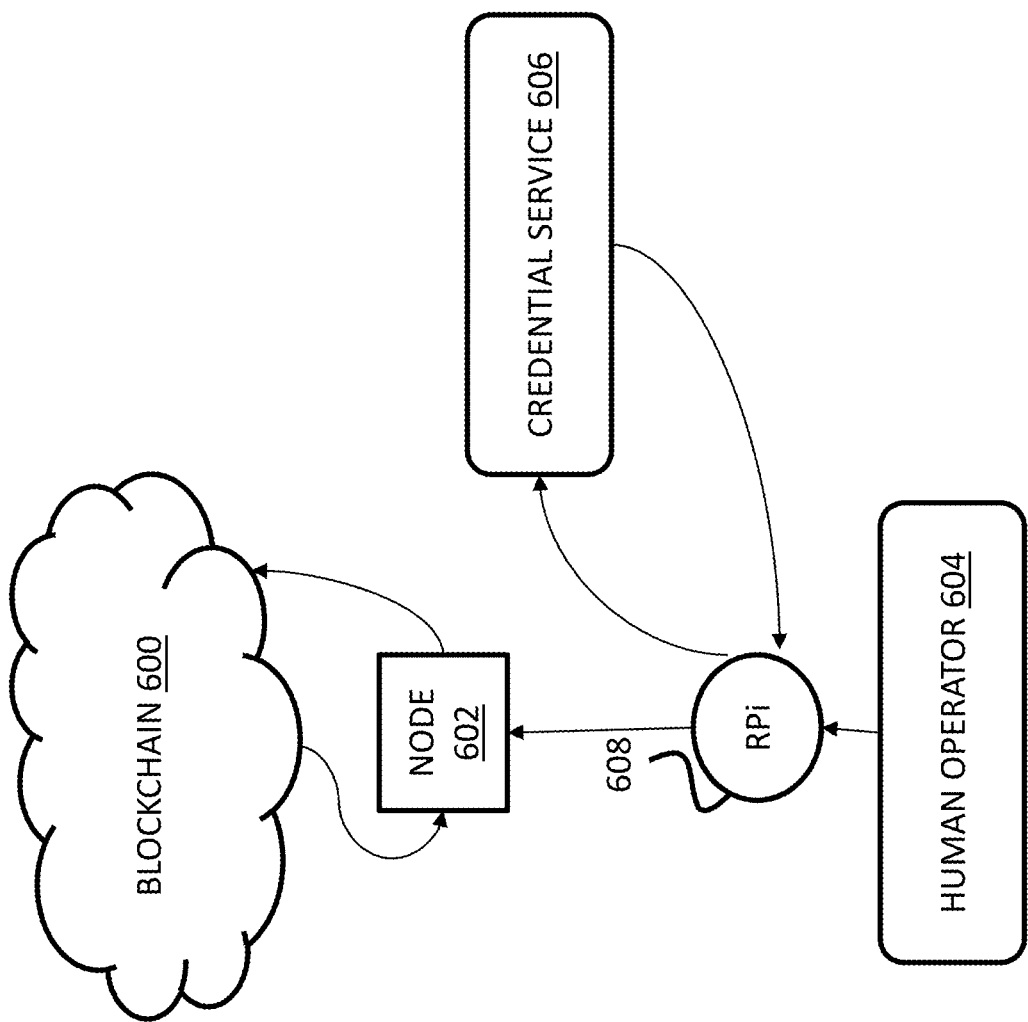
FIG. 6 illustrates a detailed block diagram of different nodes in a permissioned blockchain system, according to some embodiments of the present disclosure.

Another possible embodiment implementation of the accountable and fault tolerant distributed computing system is described in FIG. 6 which illustrates permissioning management for human interfacing of the permissioned blockchain network 300 briefly disclosed in FIG. 3.

FIG. 6 illustrates a detailed block diagram of different nodes in a permissioned blockchain system 600 for human interfacing permissioning management, according to some embodiments of the present disclosure.

The permissioned blockchain system 600 may be accessed by a human operator 604 who may or may not be authorized to access the permissioned blockchain system 600. On the other hand, a node 602 may be permissioned to access the permissioned blockchain system 600. To authenticate the human operator 604 to access the permissioned blockchain system 600, a computing terminal 608, such as Raspberry Pi (RPi) enabled terminal for exemplary purpose shown here, may be used to run a credential service 606, such as the LDAP. The result of the authentication or auditing is then recorded on the permissioned blockchain system 600. The permissions of the human operator may be resumed or revoked accordingly.

Thus, the permissioned blockchain system 600 serves as an accountable distributed system capable of fault detection, prevention, and removal, at lower computing cost and highly efficient security mechanisms such as smart contracts and kernel instrumentation.

Figure 7:
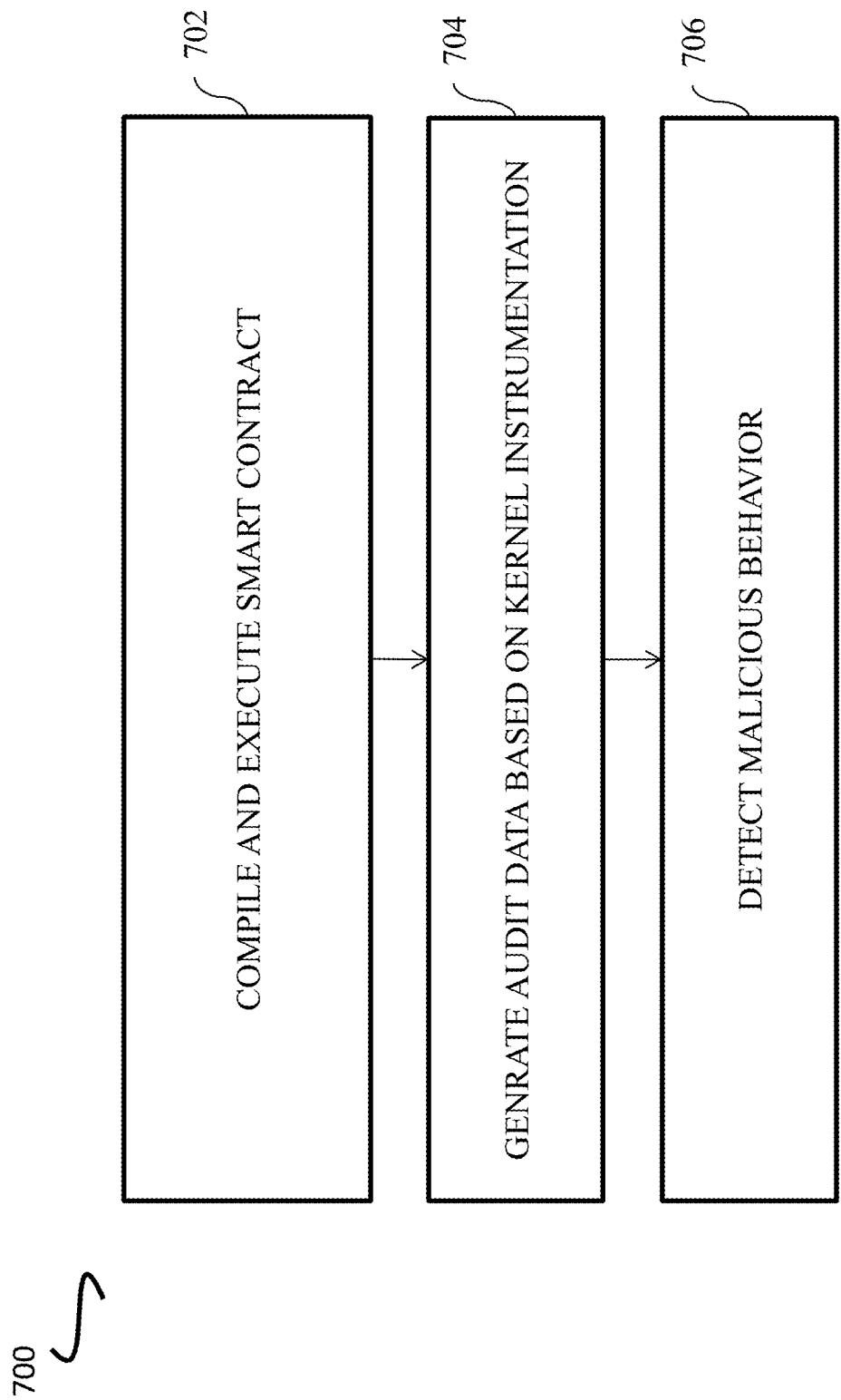
FIG. 7 illustrates a flow diagram of different nodes in a permissioned blockchain system, according to some embodiments of the present disclosure.

FIG. 7 illustrates a flow diagram of a method 700 showing different steps for fault detection and removal in an accountable permissioned blockchain network, according to some embodiments of the present disclosure.

The method 700 of FIG. 7 comprises, at step 702, compiling and executing a smart contract associated with the permissioned blockchain network. For example, referring to FIG. 2B and FIG. 2C, the permissioned blockchain network 212 may be associated with the node 150 that may receive a trusted binary file, or a source code file associated with the smart contract 204. If the smart contract 204 is in the form of a source code file, it may be compiled and then executed. In some embodiments, the smart contract 204 is in the form of an executable file itself, and does not need to be compiled. The execution of the smart contract 204 results in enforcement of a set of rules specified in the smart contract 204. The set of rules may be associated with a series of operation for performing at least one of 1) appending data into the permissioned blockchain network 212, with transactions including logs indicative of exchanging of messages between the networked computers or nodes having access to the permissioned blockchain network 212, (2) detecting malicious behavior of the networked computer, such as the node 150 in reaching a consensus, wherein the detection is performed based on kernel instrumentation of the networked computer and (3) revoking the access of the networked computer to the permissioned blockchain network 212 upon detecting the malicious behavior, or a combination thereof.

The detection of malicious behavior is done, at step 704, by generating audit data for the networked computer, such as the node 150, based on auditing of syscalls of the node 150 using any of the kernel instrumentation technologies 208. Further, the result of the auditing is stored in the permissioned blockchain network 212 through append-only data operations for audit data logs. Once, the audit data logs are submitted in this manner, at step 706, any malicious behavior on part of the node 150 may be detected, and if required, permissions of the node 150 may be revoked.

The method 700 described in FIG. 7 may be implemented in any distributed computing system, to ensure accountability, fault tolerance, and reliability of the overall distributed computing system.

Figure 8:
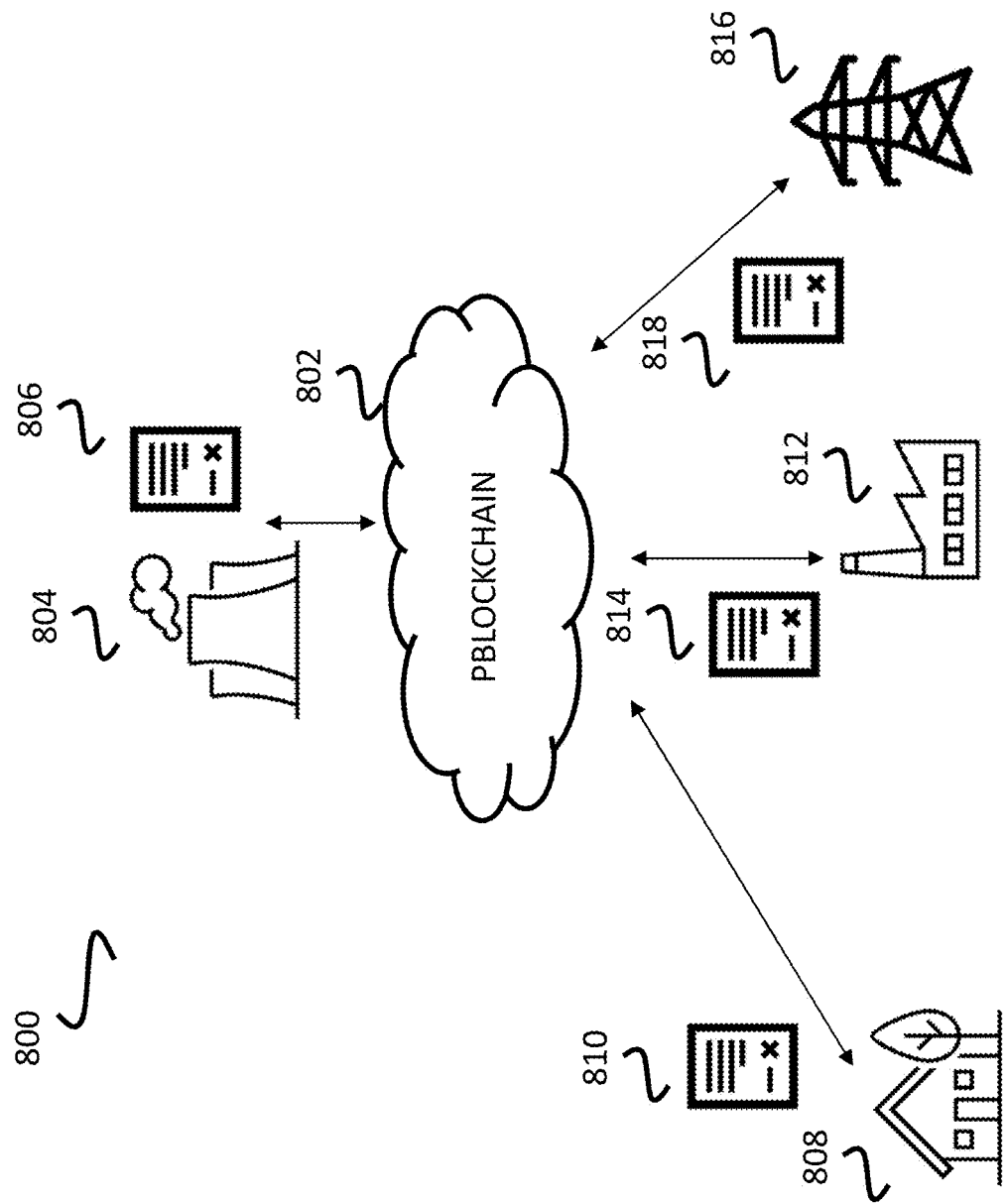
FIG. 8 illustrates an environment for detecting and removing faults in a distributed computing system, according to some embodiments of the present disclosure.

FIG. 8 illustrates a working environment 800 for detecting and removing faults in a distributed computing system, according to some embodiments of the present disclosure. The working environment 800 corresponds to a power plant 804, which may act as a parent node running an ordering service for ordering audit of different entities connected with the power plant 804 through a permissioned blockchain network 802. These different entities may include a consumer 808, an industrial unit 812, and an electricity distribution grid 816. Each of the entities 808, 812, and 816 may be connected to the permissioned blockchain network 802 through computing systems that run full or lightweight nodes, such as in the form of blockchain enabled networked computers. Further, each entity is configured to receive their individual copies of smart contracts: smart contract 810 for the consumer 808, smart contract 814 for the industrial unit 812, and smart contract 818 for the electricity distribution grid 816 from the permissioned blockchain network 802. Each smart contract may be in the form of one of a trusted binary file or a source code file, which is immutable. Further, some embodiments are based on the recognition that the copies of smart contracts of all the nodes may be common for all the nodes.

Further, each smart contract specifies rules for monitoring and auditing of each of the nodes 808, 812, and 816. For example, the rules may be related to usage of power units, metering of power consumption and attempts to tamper with metering units, sanctioning of power units for industrial consumption, allowable cap for number of units of distribution of power through grid, compliance with government and regulatory frameworks, and the like.

When each of the smart contracts 810, 814, and 818 are enforced, each type of node may be audited using kernel level instrumentation of the associated computing terminal, and the result of auditing is recorded on the permissioned blockchain network 802. Further, the different nodes may then be configured to reach a consensus about the authenticity of each of the nodes, and according to the result of the auditing and the consensus, each of the nodes may be allowed to resume their connection with the permissioned blockchain network 802 and continue having access to power generated by the power plant 804, or else, their connection may be temporarily disabled, if they fail the auditing procedures.

Thus, the various embodiments described herein provide secure, tamper resistant, efficient, reliable, and cost effective accountable distributed computing systems. The various embodiments provide for making physical (computing) auditable and accountable through digital management. Further, the fact that a lightweight client may as easily be used to implement the various techniques described herein, as a full embedded blockchain node, makes the overall system highly efficient, scalable, and cost effective. Moreover, in many permissioned blockchains, the client is a trusted binary that is shared amongst the various participating nodes acts as a trusted lightweight blockchain client.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the append claims to cover all such variations and modifications as come within the true spirit and scope of the present disclosure.

The invention claimed is:

1. A single blockchain-enabled networked computer for forming an accountable distributed computing system with different networked computers having access to a permissioned blockchain network, the single blockchain-enabled networked computer comprising: at least one processor; and memory having instructions stored thereon that, when executed by the at least one processor, cause the single blockchain-enabled networked computer to:
   compile and execute a smart contract, wherein the smart contract comprises a set of rules configuring the processor to 1) append into the permissioned blockchain transactions including logs indicative of exchanging of messages between the single blockchain-enabled networked computer and the different networked computers having access to the permissioned blockchain network, (2) detect, using the logs, malicious behavior of the single blockchain-enabled networked computer in reaching a consensus with the different networked computers having access to the permissioned blockchain network, wherein the detection is performed based on kernel instrumentation of the single blockchain-enabled networked computer and (3) revoke the access of the single blockchain-enabled networked computer to the permissioned blockchain network upon detecting the malicious behavior; and execute a distributed computing program configured to reach the consensus with the different networked computers having access to the permissioned blockchain network, wherein the distributed computing program configures the processor to exchange messages with the different networked computers having access to the permissioned blockchain network using a communication protocol unrelated to a protocol of the permissioned blockchain network; wherein the smart contract is configured to detect the malicious behavior when the single blockchain-enabled networked computer communicates different values of a same message to the different networked computers having access to the permissioned blockchain network.

2. The single blockchain-enabled networked computer of claim 1, wherein the smart contract is configured to detect malicious behavior based on analysis of one or more audit logs generated by the single blockchain-enabled networked computer in response to execution of the smart contract and the corresponding transaction of the permissioned blockchain network.

3. The single blockchain-enabled networked computer of claim 1, wherein the single blockchain-enabled networked computer is one of an observer node or an operator node within the permissioned blockchain network.

4. The single blockchain-enabled networked computer of claim 1, wherein deployment of the smart contract on the permissioned blockchain network occurs by distributing, to members of the permissioned blockchain network, at least one of a source code of the smart contract or a trusted binary file associated with a compiled smart contract.

5. The single blockchain-enabled networked computer of claim 1, wherein the smart contract is deployed as part of the kernel instrumentation of the single blockchain-enabled networked computer, such that the invocation of one or multiple types of system call requests are automatically logged by the smart contract for publishing on the permissioned blockchain network.

6. The single blockchain-enabled networked computer of claim 5, wherein malicious alteration of user space programs is detected by inspecting the permissioned blockchain network containing audit data associated with the one or multiple types of system call requests.

7. The single blockchain-enabled networked computer of claim 1, wherein the single blockchain-enabled networked computer is an observer node configured to replicate blockchains of all permissioned subnetworks the observer node is member to.

8. The single blockchain-enabled networked computer of claim 7, wherein the single blockchain-enabled networked computer has access to multiple permissioned blockchain networks including the permissioned blockchain network to ensure that the permissioned subnetworks have at least one common observer node with another subnetwork.

9. The single blockchain-enabled networked computer of claim 1, wherein the single blockchain-enabled networked computer is an operator node configured to provide audit details of its operation by submitting kernel instrumentation data uploaded to the permissioned blockchain network through deployed smart contracts.

10. The single blockchain-enabled networked computer of claim 9, wherein the operator node is configured to run the smart contract in the form of a trusted binary to write the logs to the permissioned blockchain network.

11. The single blockchain-enabled networked computer of claim 9, wherein the operator node is associated with a physical terminal configured for allowing human interaction, and further wherein the smart contract is configured to provide permissioning services for an organization.

12. A method for fault detection in a distributed system with a plurality of networked computers having access to a permissioned blockchain network and coordinating their actions by exchanging messages with each other to reach a consensus, wherein the plurality of networked computers comprises different networked computers and a single blockchain-enabled networked computer comprising at least one processor, wherein the at least one processor is coupled with stored instructions implementing the method, wherein the instructions, when executed by the processor carry out steps of the method, comprising:

compiling and executing a smart contract common for the plurality of networked computers having access to the permissioned blockchain network for fault detection, wherein the smart contract is configured to (1) append into the permissioned blockchain network transactions including logs indicative of exchanging of messages between the plurality of networked computers having access to the permissioned blockchain network, (2) detecting malicious behavior of the single blockchain-enabled networked computer in reaching the consensus with the different networked computers having access to the permissioned blockchain network, wherein the detection is performed based on kernel instrumentation of the single blockchain-enabled networked computer, wherein the smart contract is configured to detect malicious behavior by analyzing the logs in the transactions of the permissioned blockchain network, and (3) revoking the access of the single blockchain-enabled networked computer to the permissioned blockchain network upon detecting the malicious behavior; and executing a distributed computing program configured to reach the consensus with the different networked computers, wherein the distributed computing program is configured to exchange messages with the different networked computers having access to the permissioned blockchain network using a communication protocol unrelated to a protocol of the permissioned blockchain network; wherein the smart contract is configured to detect the malicious behavior when the single blockchain-enabled networked computer communicates different values of a same message to the different networked computers having access to the permissioned blockchain network.

13. The method of claim 12, wherein the smart contract is deployed as part of the kernel instrumentation of the single blockchain-enabled networked computer, such that the invocation of one or multiple types of system call requests are automatically logged by the smart contract for eventual publishing on the permissioned blockchain network.

14. The method of claim 13, wherein malicious alteration of user space programs is detected by inspecting the permissioned blockchain network containing audit data associated with the one or multiple types of system call requests.

15. A non-transitory computer readable storage medium embodied thereon a program executable by a processor for performing a method for fault detection in a distributed system with a plurality of networked computers having access to a permissioned blockchain network and coordinating their actions by exchanging messages with each other to reach a consensus, wherein the plurality of networked computers comprises different networked computers and a single blockchain-enabled networked computer implementing the method, the method comprising:

compiling and executing a smart contract common for the plurality of networked computers having access to the permissioned blockchain network for fault detection, wherein the smart contract is configured to (1) append into the permissioned blockchain network transactions including logs indicative of exchanging of messages between the plurality of networked computers having access to the permissioned blockchain network, wherein the smart contract is configured to detect malicious behavior by analyzing the logs in the transactions of the permissioned blockchain network, (2) detecting malicious behavior of the single blockchain-enabled networked computer in reaching consensus, wherein the detection is performed based on kernel instrumentation of the single blockchain-enabled networked computer, and (3) revoking the access of the single blockchain-enabled networked computer to the permissioned blockchain network upon detecting the malicious behavior; and executing a distributed computing program configured to reach consensus with the different networked computers, wherein the distributed computing program is configured to exchange messages with the different networked computers having access to the permissioned blockchain network using a communication protocol unrelated to a protocol of the permissioned blockchain network; wherein the smart contract is configured to detect the malicious behavior when the single blockchain-enabled networked computer communicates different values of a same message to the different networked computers having access to the permissioned blockchain network.

* * * * *